No. 620,788. Patented Mar. 7, 1899.
W. MADDER.
BRAKE FOR TWO WHEELED VEHICLES.
(Application filed Dec. 20, 1897.)
(No Model.) 2 Sheets—Sheet 1.
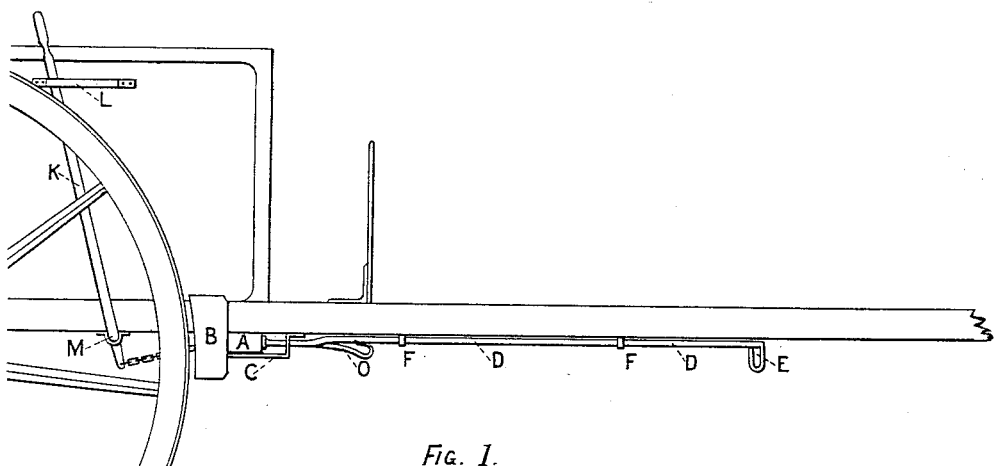
Fig. 1.
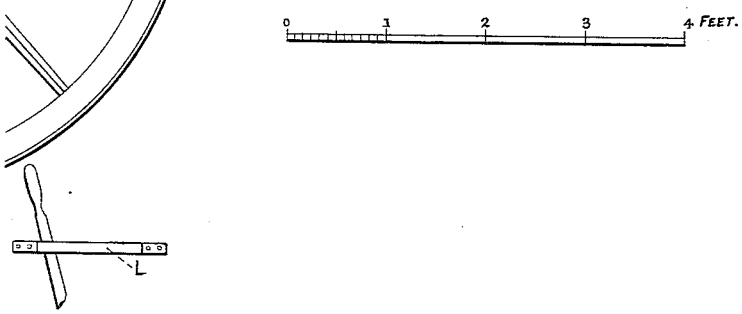
Fig. 2.
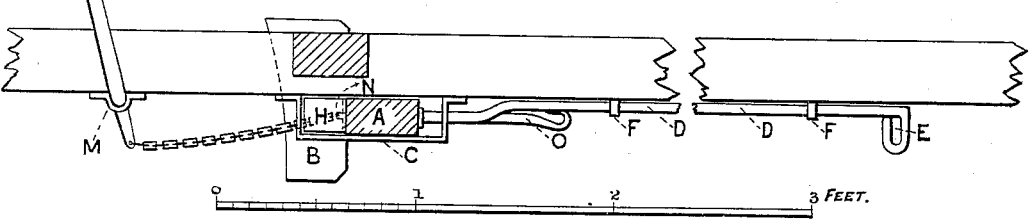

No. 620,788. Patented Mar. 7, 1899.
W. MADDER.
BRAKE FOR TWO WHEELED VEHICLES.
(Application filed Dec. 20, 1897.)
(No Model.) 2 Sheets—Sheet 2.
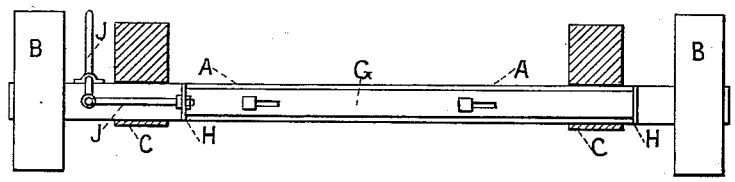
Fig. 3.
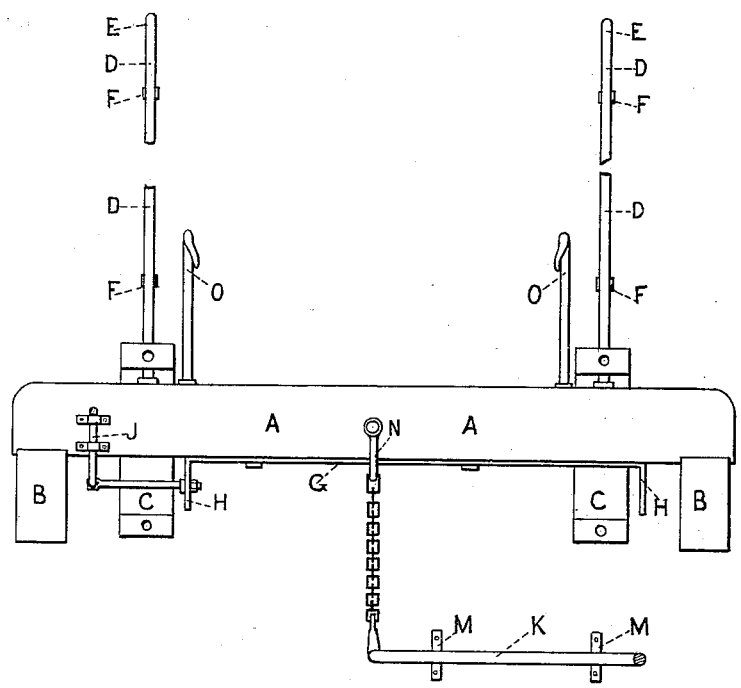
Fig. 4.
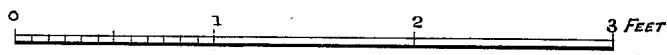
Witnesses
Inventor
William Madder
By James L. Norris

UNITED STATES PATENT OFFICE.

WILLIAM MADDER, OF NEW PLYMOUTH, NEW ZEALAND.

BRAKE FOR TWO-WHEELED VEHICLES.

SPECIFICATION forming part of Letters Patent No. 620,788, dated March 7, 1899.

Application filed December 20, 1897. Serial No. 662,961. (No model.)

*To all whom it may concern:*

Be it known that I, WILLIAM MADDER, bricklayer, a subject of Her Majesty Queen Victoria, Queen of England, residing at New Plymouth, in the provincial district of Taranaki and Colony of New Zealand, have invented new and useful Improvements in Brakes for Two-Wheeled Vehicles; and I do hereby declare that the following is a full, clear, and exact description of the invention, which will enable others skilled in the art to which it appertains to make and use the same.

This invention relates to improvements in automatic brakes as applied to light vehicles, whereby the backward strain on the breeching-strap is utilized to apply the brake, and also to means for holding the brakes out of engagement or applying them at will.

The object of the invention is to provide an automatic brake which is cheaply manufactured, durable, and effective and so constructed and applied that the force exerted by the horse in holding back the carriage when going downhill is directly and automatically applied to the brake and greatly assists the horse.

A further object is to provide means to prevent application of the brakes in cases such as when it is desired to back the horse, and also means whereby the brake may be applied by hand at any time when going on a level or as a means of increasing the pressure of the brakes when going downhill.

These objects are accomplished in the manner hereinafter explained, reference being had to the accompanying drawings, in which like reference-letters refer to like parts.

Figure 1 is a side elevation of a vehicle provided with my improved brake. Fig. 2 is partly a section view of Fig. 1. Fig. 3 is a rear view of the brake-bar, and Fig. 4 is a plan view of Fig. 3.

In the drawings, A indicates the brake-bar, provided at its outer ends with brake-shoes B B and adapted to be supported in brackets C C, secured longitudinally to the under side of the shafts. These brackets C C are of such dimensions as to allow the brake-bar to work freely backward and forward therein, for which purpose a space about twice the width of the bar is provided. This space also allows a check action to be used to stop the backward movement of the brake-bar, which will be more fully explained hereinafter.

Supported longitudinally on the under side of each shaft by guides or caps F F are the iron bars D D, provided at their forward ends with loops or eyes E E and at their rear ends passing through suitable openings in the brackets and rigidly secured to the brake-bar A. Iron bars O O, provided with upwardly-turned hooked ends, are also rigidly secured to the brake-bar and extend in the same direction, but slightly lower than the rods D D. These longitudinally-movable rods D D have the breeching-straps fastened to the loops or eyes on their forward ends instead of, as is usual, to the shafts. The traces are fastened over the hooked ends of the bars O O. The operation of these devices is readily understood, for when the horse pulls back the breeching-straps draw the bars D D backward and cause the brake-bar, to which the bars D D are rigidly attached, to slide in the guides C C until the brake-shoes B B press against the wheel. On the other hand, when the strain is transferred from the breeching-strap to the traces the brake-bar is drawn forward and out of contact with the wheels, since the traces are fastened to the bars O O, which are attached to the brake-bar.

Frequently it is desired to back the vehicle without using the brake, and this is accomplished by means of a laterally-movable iron bar G, secured to the rear side of the brake-bar and having its ends bent backward at right angles, as shown at H. Slots in this bar G work on pins in the brake-bar and allow of only a limited lateral movement. A lever-arm J within reach of the operator connects pivotally with a short iron piece which is rigidly secured to one of the ends of the bar G and serves to move said bar laterally. The operation of this checking device is best understood by reference to Figs. 3 and 4 and is as follows: The bar G being of a length about equal to the distance between the guides C C may be moved by the arm J to a position in which the bent ends H H of said bar are brought inside the guides C C to the back of the brake-bar A and when in this position prevent the brake-bar from moving backward a sufficient distance in the guides to permit the brake-shoes B B coming in contact with the wheels when the vehicle is moved backward. When the arm J is moved back to its former position, the bar G is moved laterally until the bent ends H are no longer within the guides, when the brake is again free to act when required.

As an additional precaution and safeguard I have provided the following means whereby the brake may be applied by hand independently of the above connection in case the horse should attempt to run away or in case the breeching-straps should break while going down a hill.

A lever K, held to the side of the vehicle by a metal loop which has joined to it and fixed to the cart a brake-rack, is made to pass under the vehicle, being bent for the purpose to just under its center, and is held to the under part of the floor of the vehicle by two clips M. At the center the lever is turned forward at right angles, when it is connected by a chain or other suitable means to the center of the brake-bar A at N, so that when the lever is pressed forward the brake-bar A is drawn backward and the brake-blocks B pressed against the wheel. In order to make it perfectly safe to leave the horse attached to the vehicle, all that is necessary is to bring forward the lever and to fasten the reins tightly to the top of the same. Then the more the horse tries to move forward the more the brake is applied by the reins pulling on the lever K, and if the animal tries to back the brake is applied, as hereinbefore described.

When the brake-blocks are applied by hand through the agency of the lever K, this lever can be drawn forward until the blocks grip the wheels, when it can be slipped into and held fast by the teeth of the brake-rack L, above mentioned.

What I claim is—

1. In a vehicle-brake the combination of a movable brake-bar carrying brake-shoes, brackets depending from the shafts, in which said brake-bar is movably supported, rods rigidly connected to said brake-bar and adjustably supported longitudinally under the shafts, and rods O connected to said brake-bar and provided with end catches to which the traces are hooked, substantially as described.

2. In a vehicle-brake the combination of brackets depending from the shafts, a movable brake-bar loosely supported in said brackets, a bar supported on the rear of said brake-bar and laterally adjustable thereon, lugs at the ends of said bar, and mechanism to shift said lugs in and out of the spaces in the brackets behind the brake-bar, substantially as described.

3. In a vehicle-brake, the combination of the brake-bar and the rods D and O whereby the brake is automatically applied, with a bell-crank lever carried by the wagon-body and connected to the center of the brake-bar, whereby the brake may be operated by hand, irrespective of the automatic mechanism, substantially as described.

WILLIAM MADDER.

Witnesses:
W. JORGAN,
D. JONES, Junr.